US012783844B2

(12) United States Patent
Park

(10) Patent No.: US 12,783,844 B2
(45) Date of Patent: Nov. 3, 2026

(54) MEMORY CARD, ELECTRONIC SYSTEM INCLUDING THE SAME, AND METHOD OF MANUFACTURING THE SAME

(71) Applicant: SAMSUNG ELECTRONICS CO., LTD., Suwon-si (KR)

(72) Inventor: Youngwoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 583 days.

(21) Appl. No.: 18/130,569

(22) Filed: Apr. 4, 2023

(65) Prior Publication Data

US 2024/0062034 A1 Feb. 22, 2024

(30) Foreign Application Priority Data

Aug. 17, 2022 (KR) ........................ 10-2022-0102504

(51) Int. Cl.
*G06K 19/077* (2006.01)

(52) U.S. Cl.
CPC . *G06K 19/07732* (2013.01); *G06K 19/07733* (2013.01); *G06K 19/07743* (2013.01); *G06K 19/07745* (2013.01)

(58) Field of Classification Search
CPC ............. G06K 19/077; G06K 19/0772; G06K 19/07732; G06K 19/07733; G06K 19/07743; G06K 19/07745; G06K 19/07747
USPC ..................................................... 361/679.32
See application file for complete search history.

(56) References Cited

U.S. PATENT DOCUMENTS 9,137,335 B2 * 9/2015 Hershko ............... H04W 40/00
9,202,160 B2 12/2015 Han
9,213,492 B2 12/2015 Li et al.
9,859,660 B2 * 1/2018 Lee ...................... H05K 5/0282
9,893,484 B2 * 2/2018 Lee ...................... H01R 12/721
10,445,024 B2 10/2019 Seo
2001/0025721 A1 * 10/2001 Maeda ................. G06K 19/072 174/250
2008/0286990 A1 * 11/2008 Hiew ..................... H05K 3/284 439/55
2012/0007226 A1 1/2012 Takiar et al.
2014/0301032 A1 10/2014 Stone et al.
(Continued)

FOREIGN PATENT DOCUMENTS

CN 111723029 A * 9/2020 ......... G06F 13/1694
KR 1020200007539 A 1/2020
KR 1020220085617 A 6/2022

*Primary Examiner* — Imani N Hayman
*Assistant Examiner* — Ross Terry Mularski
(74) *Attorney, Agent, or Firm* — Muir Patent Law, PLLC

(57) ABSTRACT

A memory card includes a case compliant with a first standard, corresponding to a first protocol, a card substrate embedded in the case, a plurality of external contact terminals, corresponding the first standard, on an upper surface of the card substrate and having at least a portion exposed outwardly of the case, and an integrated circuit package attached to the upper surface of the card substrate and including a plurality of package terminals corresponding to a second protocol. First external contact terminals, among the plurality of eternal contact terminals, may be electrically connected to first package terminals among the plurality of package terminals.

14 Claims, 16 Drawing Sheets

(56) References Cited

U.S. PATENT DOCUMENTS

| | | | |
|---|---|---|---|
| 2021/0390272 | A1 | 12/2021 | Yang |
| 2023/0007903 | A1 | 1/2023 | Park et al. |

* cited by examiner

200

MEMORY CARD, ELECTRONIC SYSTEM INCLUDING THE SAME, AND METHOD OF MANUFACTURING THE SAME

CROSS-REFERENCE TO RELATED APPLICATION

This application claims benefit of priority to Korean Patent Application No. 10-2022-0102504 filed on Aug. 17, 2022 in the Korean Intellectual Property Office, the disclosure of which is incorporated herein by reference in its entirety.

BACKGROUND

1. Field

The present disclosure relates to a memory card, an electronic system including the memory card, and a method of manufacturing the memory card.

2. Description of the Related Art

With the recent development of technologies for storage media, various memory cards used as storages of mobile devices have been developed. For example, in response to demand for a storage device having high-performance data input/output, universal flash storage (UFS) devices inputting/outputting data based on a UFS protocol have been manufactured.

A storage device may be manufactured as an integrated circuit package to be applied to mobile devices.

SUMMARY

Embodiments are directed to a memory card including a case compliant with a first standard, corresponding to a first protocol; a card substrate embedded in the case; a plurality of external contact terminals corresponding to the first standard on an upper surface of the card substrate, the external contact terminals having at least a portion exposed outwardly of the case; and an integrated circuit package attached to the upper surface of the card substrate, the integrated circuit package including a plurality of package terminals corresponding to a second protocol, wherein first external contact terminals among the plurality of external contact terminals are electrically connected to first package terminals among the plurality of package terminals Example embodiments provide a memory card compliant with a first standard. The memory card may accommodate an integrated circuit package compliant with a second standard to improve compatibility of the integrated circuit package with a host device and to increase utilization of the integrated circuit package.

According to an example embodiment, a memory card may include: a case compliant with a first standard, corresponding to a first protocol; a card substrate embedded in the case; a plurality of external contact terminals that correspond to the first standard, the external contact terminals being on an upper surface of the card substrate and having at least a portion of the external contact terminals exposed outwardly of the case; and an integrated circuit package attached to the upper surface of the card substrate and including a plurality of package terminals corresponding to a second protocol. First external contact terminals, among the plurality of eternal contact terminals, may be electrically connected to first package terminals among the plurality of package terminals.

BRIEF DESCRIPTION OF DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein.

Figure 1:
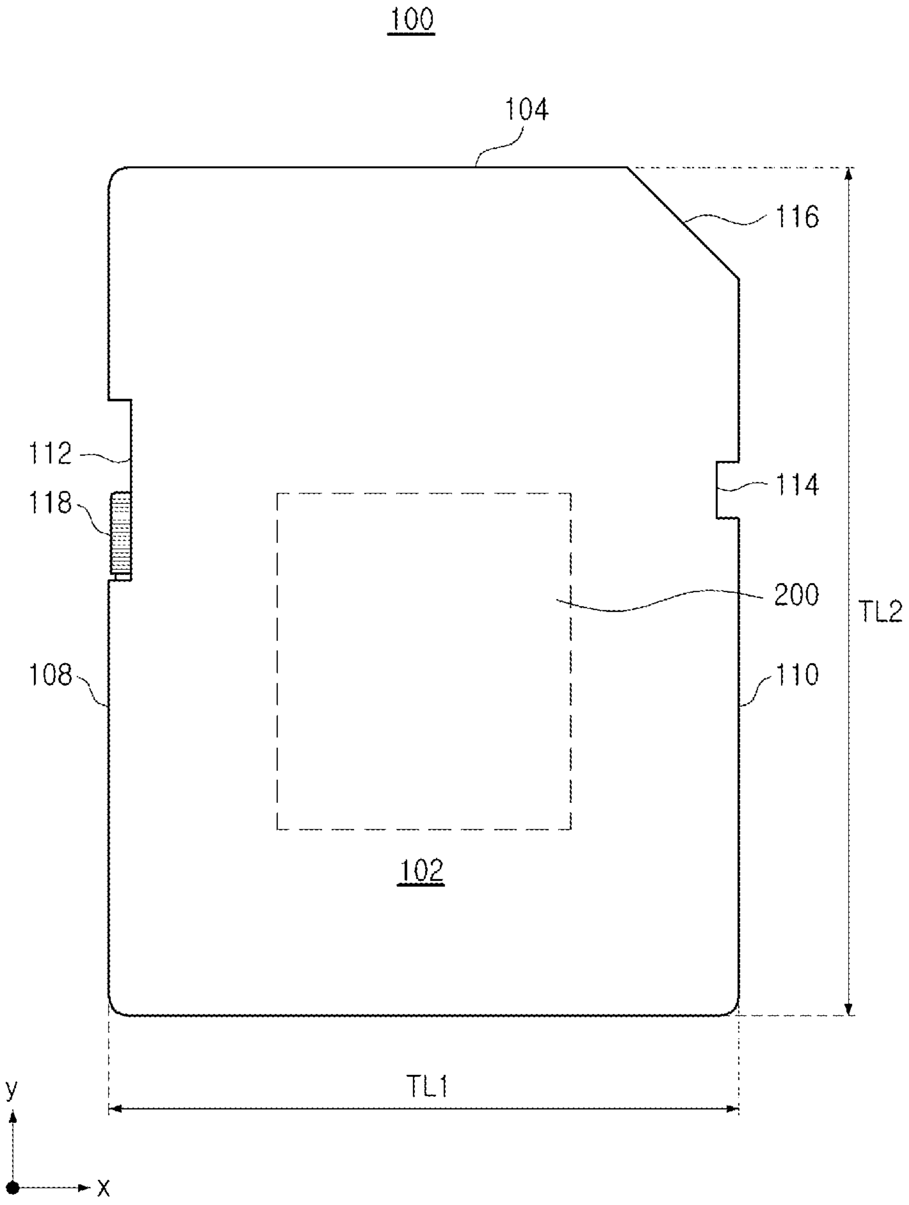
FIGS. 1 to 3 are views illustrating a memory card according to an example embodiment.
Figure 2:
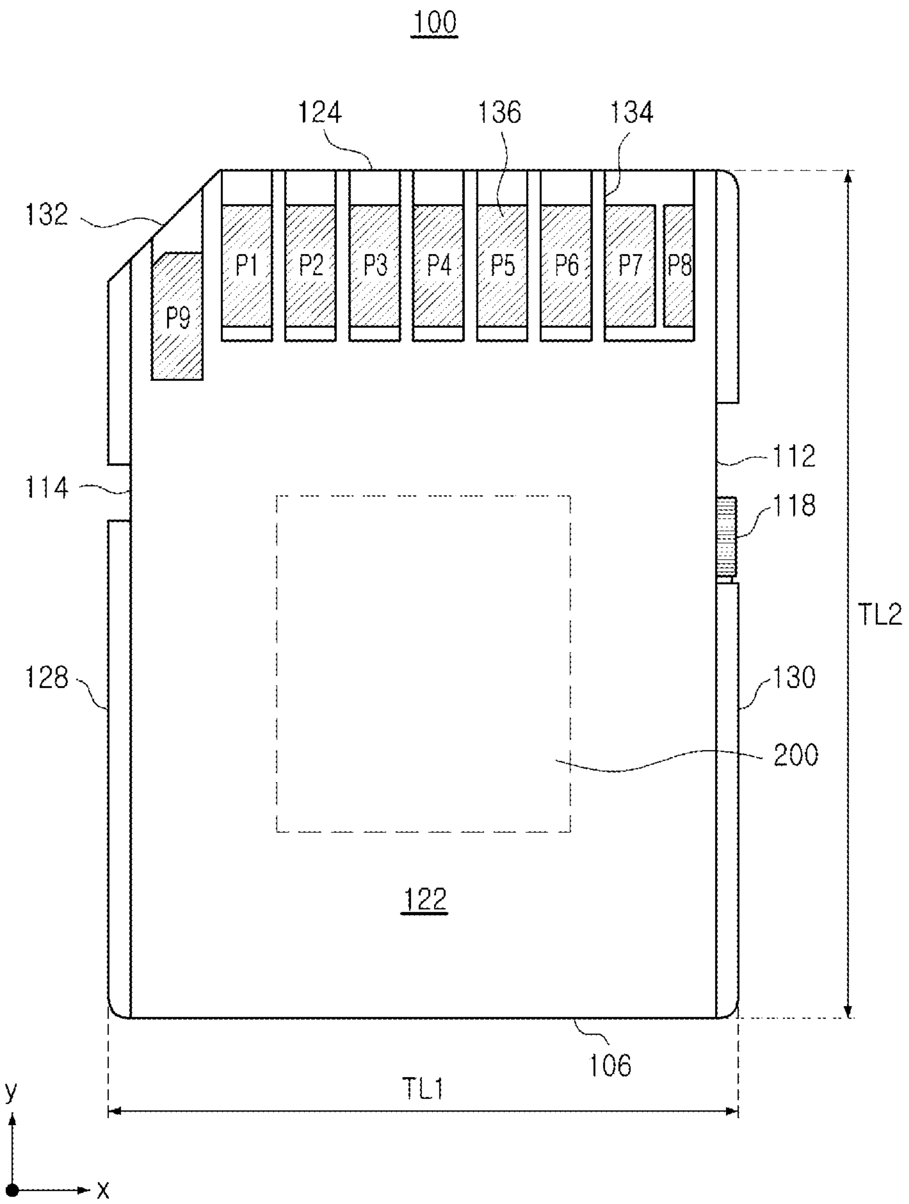
Figure 3:
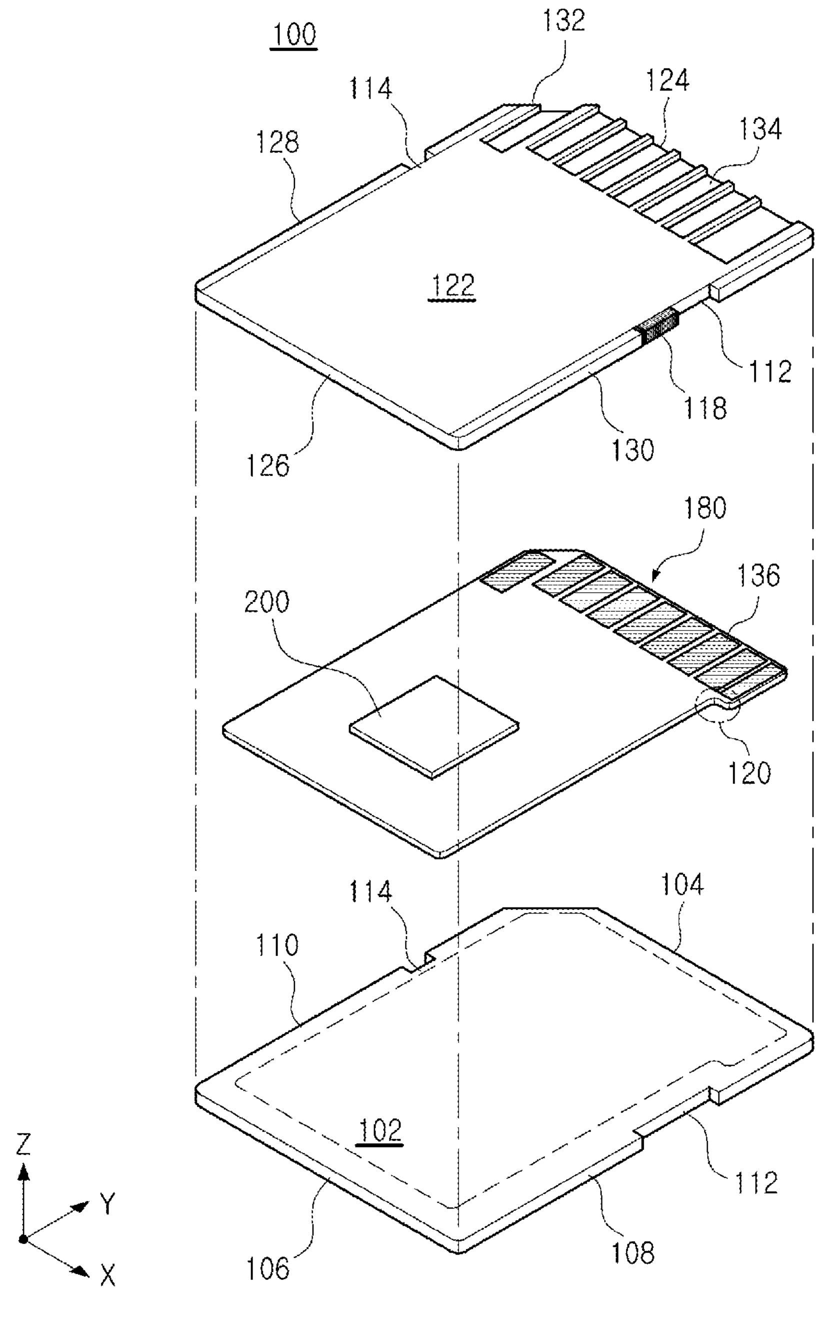

FIGS. 1 to 3 are views illustrating a memory card according to an example embodiment. FIGS. 1 and 2 are an upper plan view and a lower plan view of a memory card 100, respectively. FIG. 3 is an exploded perspective view of a memory card. An X-axis direction and a Y-axis direction are parallel to a surface of the memory card 100.

The Y-axis direction is perpendicular to the X-axis direction on the surface of the memory card 100. The Z-axis direction is perpendicular to the X-axis direction and the Y-axis direction. The X-axis direction and the Y-axis direction may be a major-axis direction and a minor-axis direction of the memory card 100, respectively.

The memory card 100 may include a case including an upper case 102, a lower case 122, a card substrate 180, and an integrated circuit package 200. The integrated circuit package 200 may be referred to as a semiconductor package. The upper case 102 and the lower case 122 may accommodate the card substrate 180 and the integrated circuit package 200. The upper case 102 may be coupled to the lower case 122. The upper case 102 and the lower case 122 may be referred to as a housing. The upper case 102 and the lower case 122 may also be referred to as an outer lid.

The memory card 100 may have a form factor of a secure digital (SD) card. For example, a standard of the memory card 100 may be determined as a standard specification. Lengths of the memory card 100, for example, the upper and lower cases 102 and 122, in the X-axis direction and the Y-axis direction may be referred to as TL1 and TL2, respectively. In some embodiments, TL1 and TL2 may be 24 mm and 32 mm, respectively.

The integrated circuit package 200 may be a multichip package (MCP) including different types of semiconductor chips. The integrated circuit package 200 may have a system-in-package (SIP) structure in which a plurality of semiconductor chips are stacked or arranged in a single package to have a single independent function. For example, the integrated circuit package 200 may be a universal flash storage (UFS) device including a controller and a plurality of memory chips stacked.

When the integrated circuit package 200 is a UFS package, a specification of the integrated circuit package 200 may also be determined as a standard specification. For example, the integrated circuit package 200 may have a length of 11.5 mm in the X-axis direction and a length of 13 mm in the Y-axis direction.

An integrated circuit package such as a UFS package may be embedded in an electronic device to be used alone. For example, the UFS package may be permanently mounted in an electronic device, such as a mobile phone or a laptop computer, to be used as an auxiliary storage device.

A removable storage device supporting a UFS protocol is desirable so that a storage device supporting the UFS protocol may more widely utilize the protocol. A UFS card has been proposed as a removable storage device, but it may be difficult to use an UFS card in an electronic device that does not include a UFS card socket, particularly when a different standard is adopted for a UFS card.

According to an example embodiment, a memory card 100 may embed the card substrate 180 and the integrated circuit package 200 in the cases 102 and 122 having the form factor of the SD card. The integrated circuit package 200 may further include external contact terminals 136 exposed outwardly of the case on the card substrate 180. The integrated circuit package 200 may be attached to the card substrate 180 inside the case, and contact terminals of the integrated circuit package 200 may be connected to the external contact terminals 136. According to an example embodiment, the compatibility of the integrated circuit package 200 may be improved and utilization of the integrated circuit package 200 may be increased.

In FIGS. 1, and 3, the upper case 102 and the lower case 122 will be described with respect to main components thereof. As illustrated in FIG. 3, the upper case 102 may have a first upper case edge 104 and a second upper case edge 108 connected to the first upper case edge 104. In addition, the upper case 102 may have a third upper case edge 106, connected to the second upper case edge 108, and a fourth upper case edge 110 connected to the third upper case edge 106 and the first upper case edge 104.

An inclined upper case chamfer 116 may be disposed in a corner portion between the first upper case edge 104 and the fourth upper case edge 110. For example, the upper case chamfer 116, having a form in which a corner portion is cut, may be disposed between the first upper case edge 104 and the fourth upper case edge 110.

As illustrated in FIG. 2, the lower case 122 may have a first lower case edge 124 and a second lower case edge 130 connected to the first lower case edge 124. In addition, the lower case 122 may have a third lower case edge 126, connected to the second lower case edge 130, and a fourth lower case edge 128 connected to the third lower case edge 126 and the first lower case edge 124.

An inclined lower case chamfer may be disposed in a corner portion between the first lower case edge 124 and the fourth lower case edge 128. For example, a lower case chamfer 132, having a form in which a corner portion is cut, may be disposed between the first lower case edge 124 and the fourth lower case edge 128.

The lower case 122 may have openings 134 exposing the external contact terminals 136 of the integrated circuit package 200. The external contact terminals 136 may include first to ninth external contact terminals P1 to P9.

The external contact terminals 136 may include signal terminals, ground terminals, and power terminals. Among the external contact terminals 136, the first to eighth external contact terminals P1 to P8 may be aligned in a parallel direction (an X-axis direction), and the ninth external contact terminal P9 may be disposed to be lower than the first to eighth external contact terminals P1 to P8 in a negative vertical direction (a negative Y-axis direction) due to the chamfers 106 and 132.

As illustrated in FIG. 3, the card substrate 180 and the integrated circuit package 200 may be disposed between the upper and lower cases 102 and 122 of the memory card 100. For example, the integrated circuit package 200 may be disposed inside the upper and lower cases 102 and 122. For ease of description, in FIG. 3, the upper case 102 may be referred to as an overlying case and the lower case 122 may be referred to an underlying case.

The first upper case edge 104, the second upper case edge 108, the third upper case edge 106, and the fourth upper case edge 110 may be aligned with and coupled to the first lower case edge 124, the second lower case edge 130, the third lower case edge 126, and the fourth lower case edge 128, respectively. The upper case chamfer 116 may be aligned with and coupled to the lower case chamfer 132.

The upper case 102 and the lower case 122 may have a first recess groove 112 and a second recess groove 114. The first recess groove 112 may be disposed in the second upper case edge 108 and the second lower case edge 130 to be adjacent to the first upper and first lower case edges 104 and 124. The first recess groove 112 may be a groove recessed inwardly of the upper case 102 and the lower case 122.

A switch 118 may be disposed in the first recess groove 112. The switch 118 may vertically move within the first recess groove 112. The switch 118 may be a member controlling ON/OFF switching of a write function of the integrated circuit package 200. The switch 118 may be a member controlling ON/OFF switching of a write function of the memory card 100.

The second recess groove 114 may be disposed in the fourth upper and fourth lower case edges 110 and 128 to be adjacent to the first upper and first lower case edges 104 and 124. The second recessed groove 114 may be a groove recessed into the upper case 102 and the lower case 122. The second recess groove 114 may be a groove member used when the memory card 100 is inserted into an external device.

A rounded notch 120 may be installed in a corner portion of the card substrate 180 to be adjacent to the first recess groove 112. When the rounded notch 120 is installed in the corner portion of the card substrate 180, probability of collision between the card substrate 180 and the switch 118 may be reduced, and heat dissipation characteristics may be improved to improve reliability, for example, warpage characteristics.

The integrated circuit package 200 may be a system-in-package or a multichip package. The integrated circuit package 200 may include a memory stacked chip, a controller chip, or the like. The integrated circuit package 200 may be a single package including a memory stacked chip and a controller chip. A structure of the integrated circuit package 200 will be described below in detail.

Figure 4:
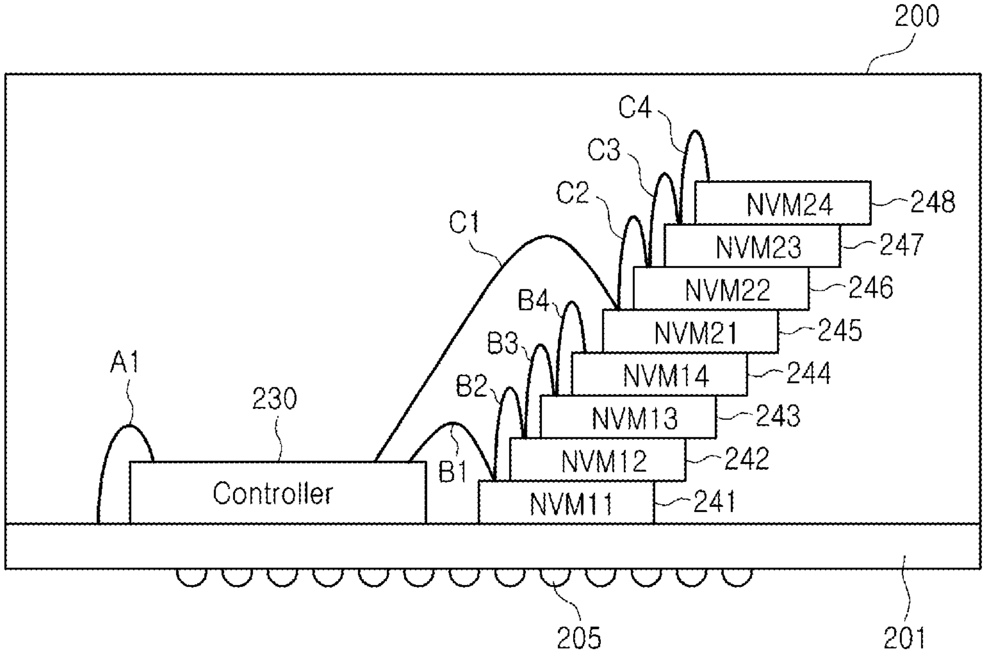
FIGS. 4 and 5 are views illustrating an integrated circuit package included in the memory card of FIGS. 1 to 3.
Figure 5:
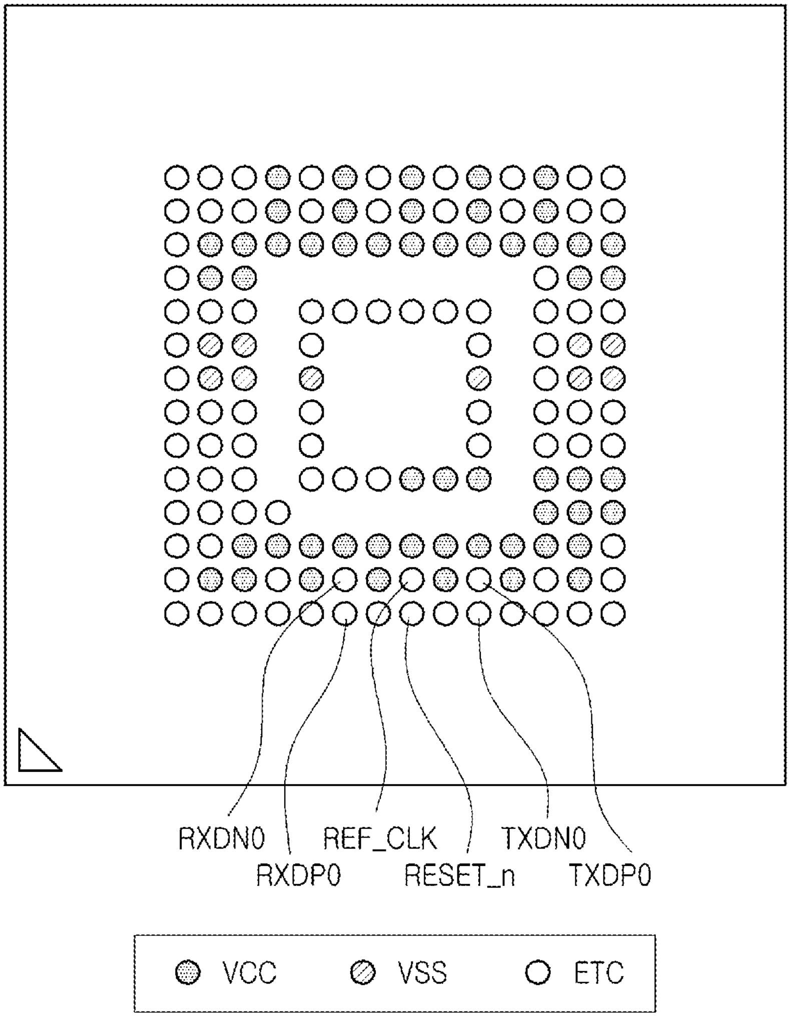

FIGS. 4 and 5 are views illustrating an integrated circuit package included in the memory card of FIGS. 1 to 3.

FIG. 4 illustrates a cross-section of the integrated circuit package 200 of FIG. 3 taken in a direction perpendicular to an X-Y plane. FIG. 5 illustrates a lower surface of the integrated circuit package 200.

Referring to FIG. 4, the integrated circuit package 200 may include a package substrate 201, a plurality of semiconductor chips 230 and 241 to 248, and external contact terminals 205. The package substrate 201 may include a plurality of conductive layers and through-silicon vias (TSVs) separated by an insulating layer therein. The conductive layers and the TSVs of the package substrate 201 may be connected to the external contact terminals 205 of the integrated circuit package 200. For example, the external contact terminals 205 of the integrated circuit package 200 may be implemented as package balls or leads.

The integrated circuit package 200 may be a memory system providing high-capacity and high-speed memory chips. The integrated circuit package 200 may include memory chips 241 to 248. The memory chips 241 to 248 may include nonvolatile memory devices. For example, the nonvolatile memory devices may include a flash memory, a phase change random access memory (PRAM), a resistance random access memory (RRAM), a magnetic random access memory (MRAM), a ferroelectric random access memory (FRAM), an electrically erasable programmable read-only memory (EEPROM), a nano-floating gate memory (NFGM), a polymer random access memory (PoRAM), or the like.

The integrated circuit package 200 may further include a controller chip 230. The controller chip 230 may control the memory chips 241 to 248. For example, the controller chip 230 may transmit and receive signals to and from a device through a first interconnection A1 connected to an external entity through the package substrate 201. The controller chip 230 may control the memory chips 241 to 248 based on a signal received from an external device.

The controller chip 230 may be connected to the memory chips 241 to 248 through the second interconnections B1 to B4 and the third interconnections C1 to C4. In the example of FIG. 4, the integrated circuit package 200 may include memory chips 241 to 244, transmitting and receiving signals to and from a controller through the second interconnection B1, and memory chips 245 to 248 transmitting and receiving signals to and from the controller through the third interconnection C1. For example, the integrated circuit package 200 may include two channels.

FIG. 4 illustrates that the interconnections A1, B1 to B4, and C1 to C4 are connected by a wire bonding method. However, the present disclosure is not limited thereto. In some implementations, interconnections may be implemented as TSVs.

Referring to FIG. 5, the integrated circuit package 200 may include a plurality of package terminals on a lower surface portion. For example, the plurality of package terminals may include solder balls and may constitute a ball array. The package terminals may include first power supply terminals VCC, second power supply terminals VSS, and other signal terminals ETC. The first power supply terminals VCC may be terminals for receiving a main power supply voltage of the integrated circuit package 200, and the second power supply terminals VSS may be terminals that may be connected to a ground. One of the first power supply terminals VCC may be connected to a main power supply, and one of the second power supply terminals VSS may be connected to the ground.

The other signal terminals ETC may include various signal terminals determined based on a communication protocol supported by the integrated circuit package 200. For example, when the integrated circuit package 200 is a UFS package, the other signal terminals ETC may include a reference clock signal terminal REF_CLK, a hardware reset signal terminal RESET_n, differential input signal terminals RXDP0 and RXDN0, and differential output signal terminals TXDP0 and TXDN0. Signals transmitted and received by the UFS package will be described below with reference to FIG. 13.

FIG. 5 illustrates a case in which the integrated circuit package 200 is a BGA-153 UFS package having 153 package terminals, but a standard of the integrated circuit package 200 that may be applied to the present disclosure is not limited thereto. For example, the integrated circuit package 200 may be a UFS package having the BGA-169 and BGA-253 standards, and may be an embedded multimedia card (eMMC) or an embedded multichip package (eMCP).

According to example embodiments, the power supply terminals VCC and VSS and other signal terminals ETC of the integrated circuit package 200 included in the memory card 100 having an SD form factor may be connected to external contact terminals compliant with a standard corresponding to an SD bus protocol. When the memory card 100 is mounted in an electronic device having an SD card socket, the integrated circuit package 200 may transmit and receive signals to and from an electronic device using a communications protocol such as a UFS protocol through the external contact terminals. Accordingly, compatibility of the integrated circuit package 200 may be improved.

Figure 6:
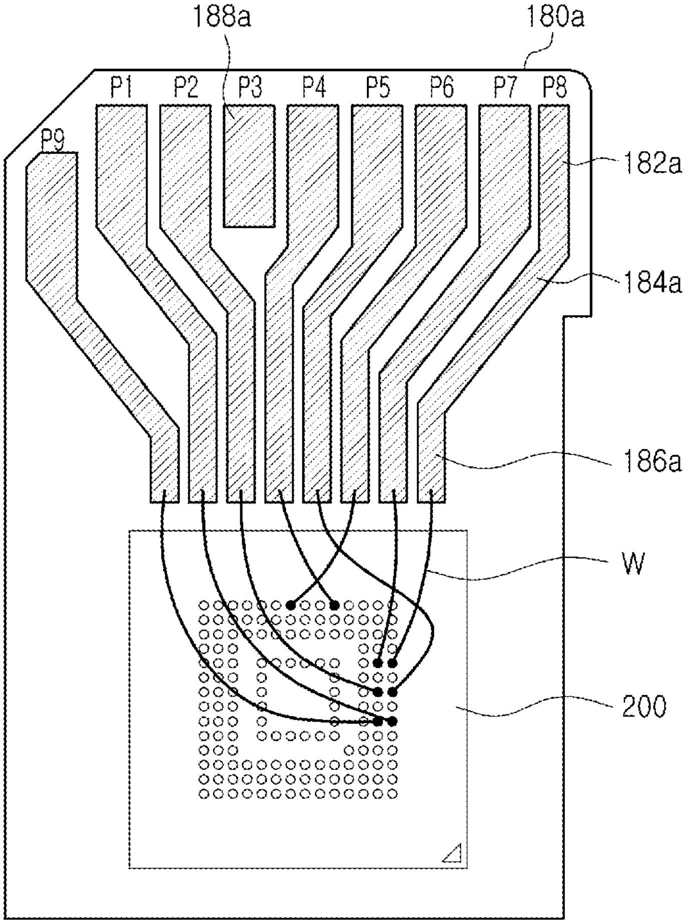
FIG. 6 is a view illustrating a memory card according to a first embodiment.

FIG. 6 is a view illustrating a memory card according to a first embodiment

FIG. 6 illustrates a card substrate 180*a*, external contact terminals 182*a* and 188*a*, interconnections 184*a* and package-side terminals 186*a*, and an integrated circuit package 200. The card substrate 180*a*, the external contact terminals 182*a* and 188*a* and the integrated circuit package 200 illustrated in FIG. 6 correspond to the card substrate 180, the external contact terminals 136, and the integrated circuit package 200 described with reference to FIGS. 1 to 3.

The external contact terminals 182*a* may be electrically connected to the package-side terminals 186*a* through the interconnections 184*a*. The external contact terminal 188*a* may be electrically separated from signal terminals of the integrated circuit package 200. For example, among external contact terminals P1 to P9, signal terminals P1, P2, and P4 to P9 corresponding to the micro SD standard may be connected to the package-side terminals 186*a*, and the remaining signal terminal P3 may be electrically separated.

According to an implementation, the external contact terminals 182*a* and 188*a*, the interconnections 184*a*, and the package-side terminals 186*a* may be printed on the card substrate 180*a* and may be attached to the card substrate 180*a*.

According to the first embodiment, the package-side terminals 186*a* may be connected to the signal terminals of the integrated circuit package 200 through wires W. A lower surface including signal terminals of the integrated circuit package 200 may be exposed on an upper surface of the card substrate 180*a*, and an upper surface of the integrated circuit package 200 may be attached to an upper surface of the card substrate 180*a*.

An example of a connection relationship between the external contact terminals P1 to P9 and the signal terminals of the integrated circuit package 200 according to an example embodiment is illustrated in Table 1.

TABLE 1

| External Contact Terminal | SD Card Signal | UFS Package Signal |
|---|---|---|
| P1 | DATA3 | RXDP0 |
| P2 | CMD | RESET_n |
| P3 | VSS1 | Unconnected |
| P4 | VDD | VCC |
| P5 | CLK | REF_CLK |
| P6 | VSS2 | VSS |
| P7 | DATA0 | TXDP0 |
| P8 | DATA1 | TXDN0 |
| P9 | DATA2 | RXDN0 |

In Table 1, "SD card signal" represents signals that may be transmitted or received by each of the external contact terminals P1 to P9 under the SD bus protocol. And "UFS package signal" represents signals that may be transmitted by the external contact terminals P1 to P9 connected to the integrated circuit package 200 according to an example embodiment.

In the example of Table 1, the external contact terminals P4 and P6 provided to receive the power signals VDD and VSS2 under the SD card standard may be connected to the power supply signal terminals VCC and VSS of the integrated circuit package 200. The external contact terminal P5 provided to receive the clock signal CLK may be connected to the reference clock signal terminal REF_CLK of the integrated circuit package 200. Among the external contact terminals provided to transmit and receive data, some external contact terminals P7 and P8 may be connected to the differential output signal terminals TXDP0 and TXDN0, and other external contact terminals P1 and P9 may be connected to the differential input signal terminals RXDP0 and RXDN0. In addition, the external contact terminal P2 provided to receive the command CMD may be connected to the hardware reset signal terminal RESET_n.

In the present disclosure, the connection relationship between the external contact terminals P1 to P9 and the package terminals is not limited to the example of Table 1. For example, the external contact terminals P1 to P9 may be connected to the signal terminals of the integrated circuit package 200 in any manner, regardless of the type of signal that may be transmitted or received under the SD standard. In addition, when the integrated circuit package 200 is an eMMC or an eMCP rather than a UFS package, the external contact terminals P1 to P9 may be connected to terminals transmitting and receiving signals having a type that is different from the type of the signals illustrated in Table 1.

Figure 7A:
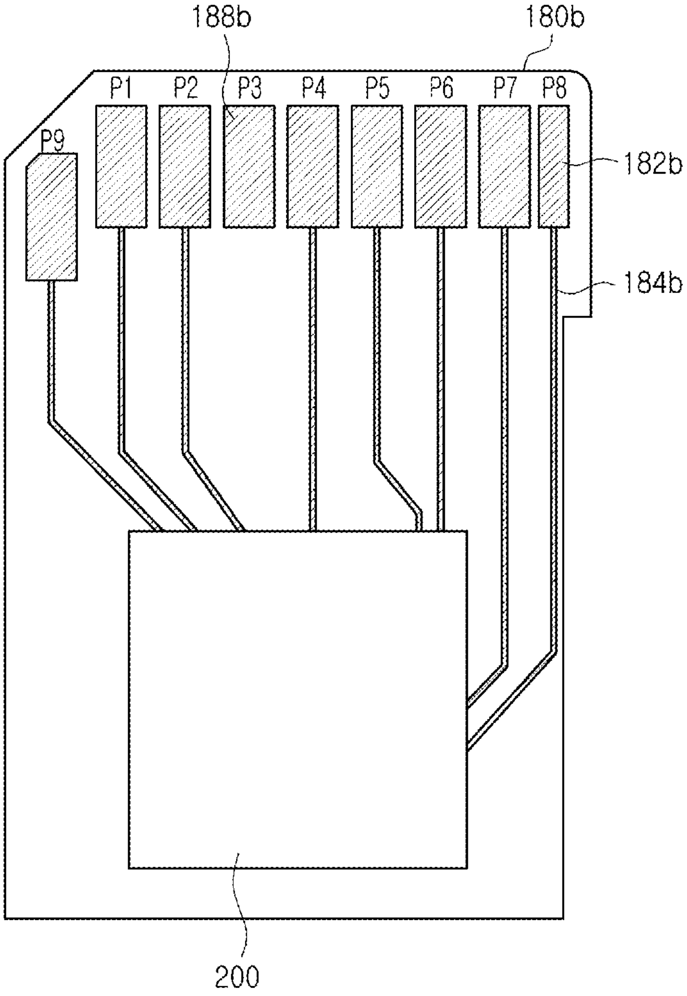
FIGS. 7A and 7B are views illustrating a memory card according to a second embodiment.
Figure 7B:
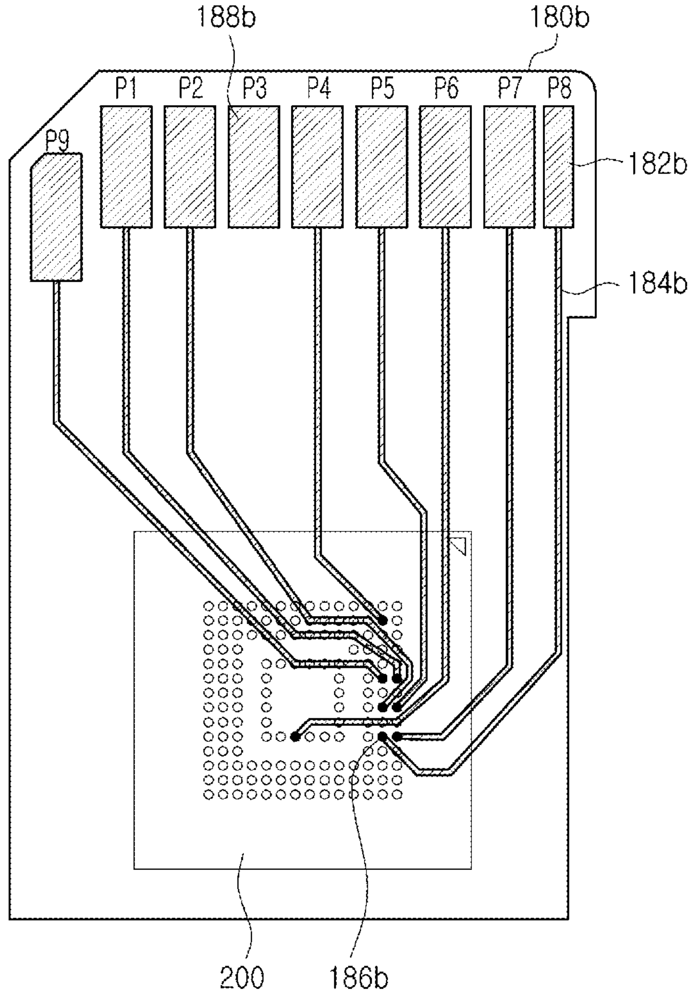

FIGS. 7A and 7B are views illustrating a memory card according to another embodiment.

FIGS. 7A and 7B illustrate a card substrate 180*b*, external contact terminals P1 to P9, and an integrated circuit package 200. The card substrate 180*b*, external contact terminals 182*b* and 188*b*, and the integrated circuit package 200 illustrated in FIGS. 7A and 7B correspond to the card substrate 180, the external contact terminals 136, and integrated circuit package 200 described with reference to FIGS. 1 to 3.

Referring to FIG. 7A, external contact terminals 182*b* may be electrically connected to the integrated circuit package 200 through interconnection patterns 184*b*. The external contact terminal 188*b* may be insulated from the integrated circuit package 200.

According to an implementation, the card substrate 180*b* may be a printed circuit board (PCB), and the external contact terminals 182*b* and 188*b* may be printed on the card substrate 180*b*. A lower surface including signal terminals of the integrated circuit package 200 may be attached to an upper surface of the card substrate 180*b* to be electrically connected to the external contact terminals P1 to P9.

FIG. 7B illustrates an upper surface of the card substrate 180*b* and a lower surface of the integrated circuit package 200 while overlapping each other. Referring to FIG. 7B, memory card-side terminals 182*b* may be electrically connected to signal terminals of the integrated circuit package 200 through interconnection patterns 184*b* and package-side terminals 186*b*. For example, the signal terminals of the integrated circuit package 200 and the package-side terminals 186*b* may be soldered to be electrically connected to each other, and the integrated circuit package 200 may be attached to the upper surface of the card substrate 180*b*.

The external contact terminals P1 to P9 may have various connection relationships to the signal terminals of the integrated circuit package 200. For example, the external contact terminals P1 to P9 may have a connection relationship as illustrated above in Table 1.

The interconnection patterns 184*b* may be electrically insulated from, in detail, remaining signals terminals rather than signal terminals corresponding to the external contact terminals P1 to P9, among the signal terminals of the integrated circuit package 200. Hereinafter, a method of manufacturing a memory card according to a second embodiment will be described in detail.

FIGS. 8 to 12 are views illustrating a method of manufacturing a memory card according to the second embodiment.

Figure 8:
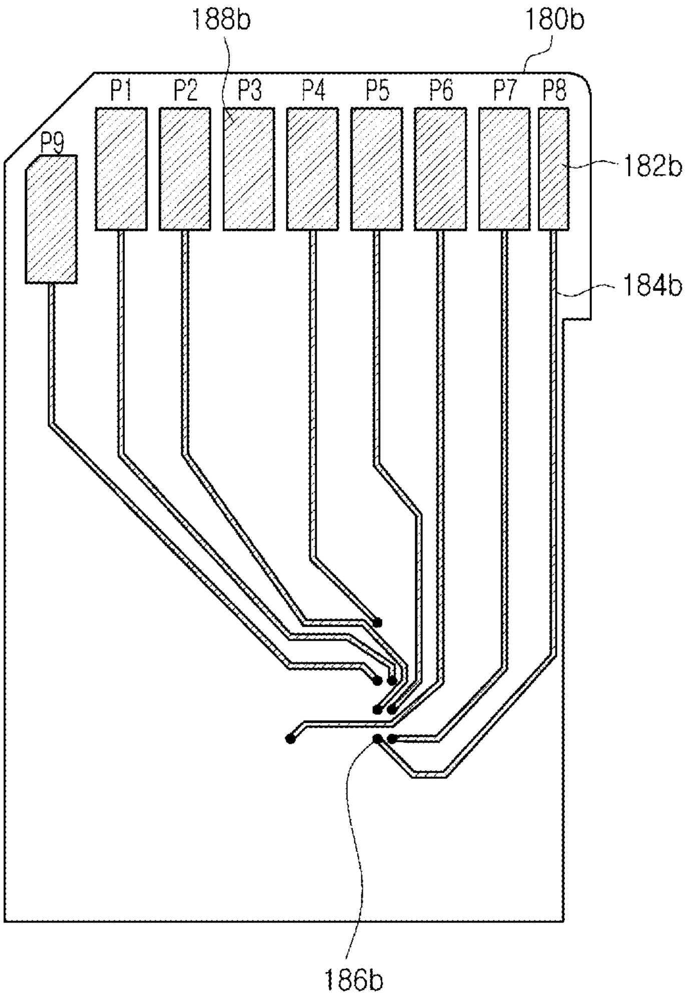
FIGS. 8 to 12 are views illustrating a method of manufacturing a memory card according to the second embodiment.

Referring to FIG. 8, interconnection patterns 182*b*, 184*b*, 186*b*, and 188*b* may be printed on an upper surface of the card substrate 180*b*. For example, the card substrate 180*b* may include a body layer formed by compressing an epoxy glass (or FR-4) resin, a phenol resin, a BT resin, or the like, to have a predetermined thickness. The interconnection patterns 182*b*, 184*b*, 186*b*, and 188*b* may be formed by patterning a copper foil coated on the body layer.

Figure 9:
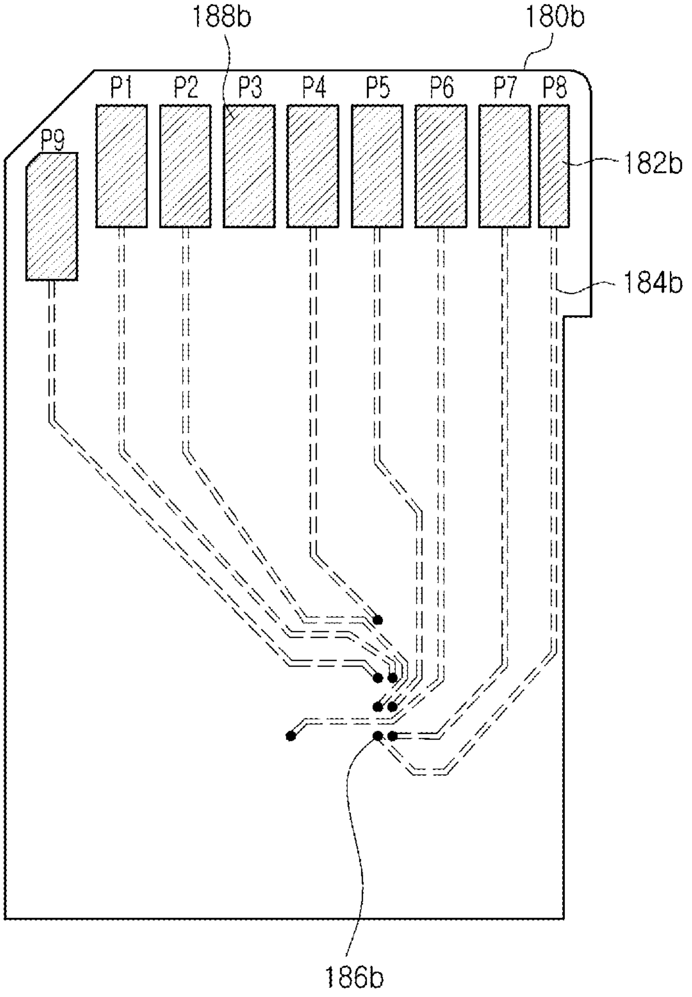

Referring to FIG. 9, the upper surface of the card substrate 180*b*, on which the interconnection patterns 182*b*, 184*b*, 186*b*, and 188*b* are printed, may be covered with solder resist, and the solder resist may then be patterned to expose the memory card-side terminals 182*b* and 188*b* and the package-side terminals 186*b*. The interconnection patterns 184*b* may be insulated by the solder resist. In FIG. 9, the exposed interconnection patterns are denoted by solid lines and insulated interconnection patterns are denoted by broken lines.

Figure 10:
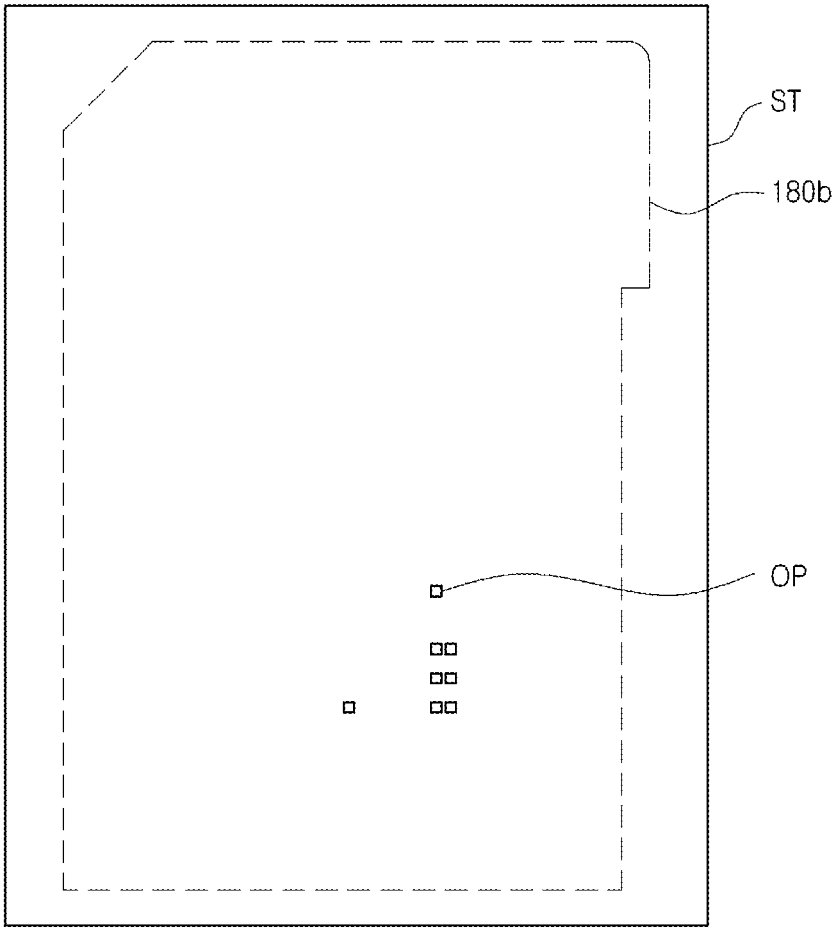

Referring to FIG. 10, a stencil mask ST for soldering of the package-side terminals 186*b* may be formed. The stencil mask ST may be formed to include openings OP corresponding to locations of the package-side terminals 186*b*. Solder paste may be applied to the card substrate 180*b* masked by the stencil mask ST.

Figure 11:
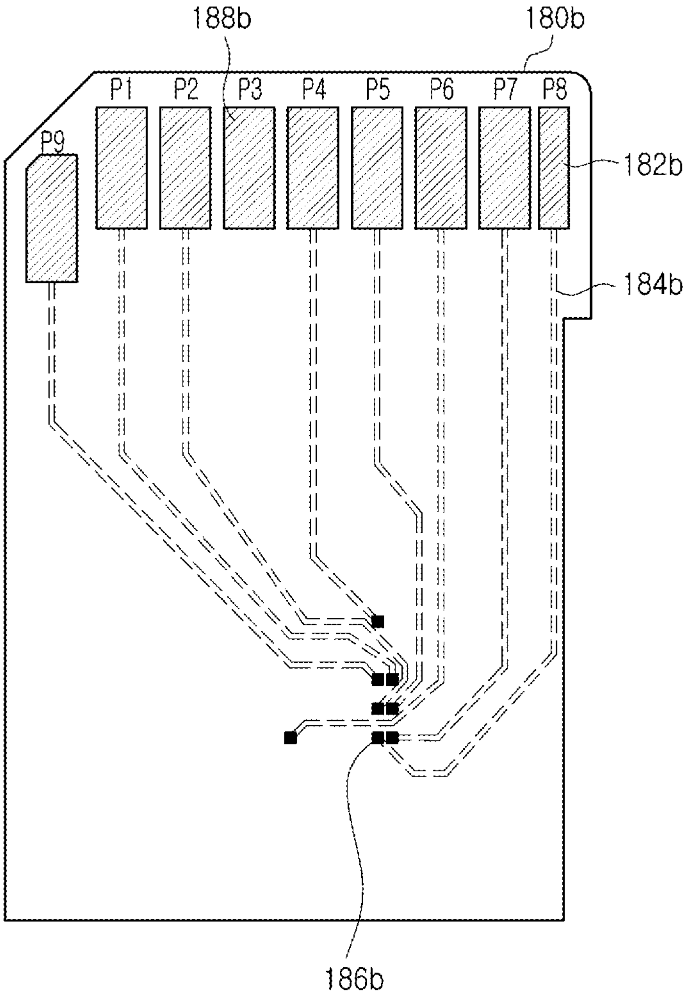

Referring to FIG. 11, the package-side terminals 186*b* may be soldered with a solder paste. When the package-side terminals 186*b* are soldered, the stencil mask ST may be removed.

Figure 12:
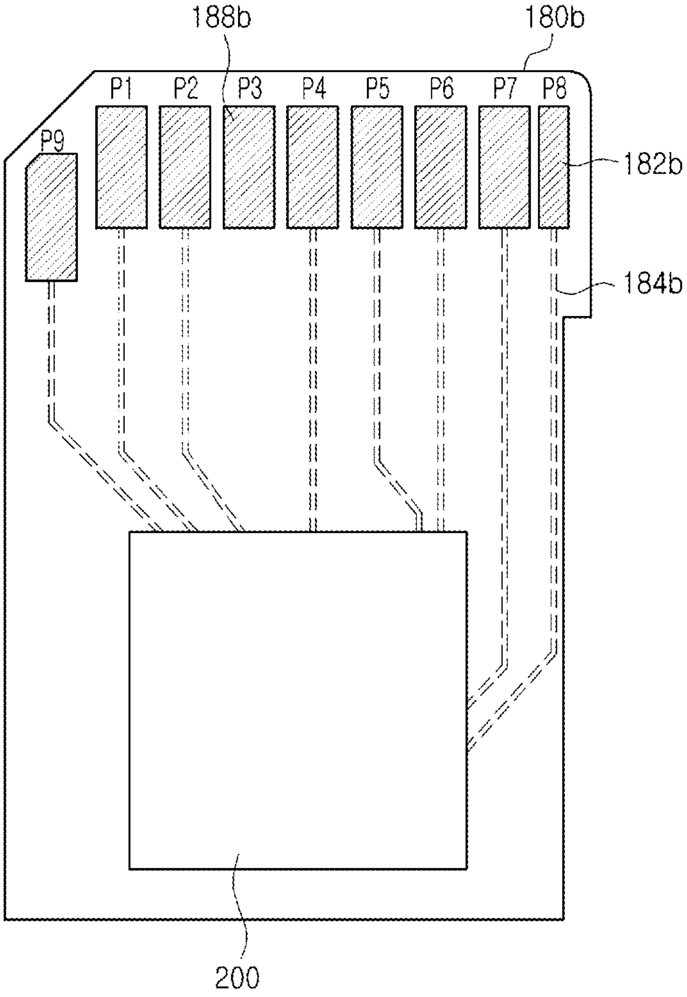

Referring to FIG. 12, an integrated circuit package 200 may be disposed on the upper surface of the card substrate 180*b*, and the card substrate 180*b* and the integrated circuit package 200 may be heated. The solder paste for soldering the package-side terminals 186*b* may be bonded to corresponding signal terminals of the integrated circuit package 200.

After the integrated circuit package 200 is bonded to the card substrate 180*b* as described with reference to FIGS. 8 to 12, an upper case 102 and a lower case 122 surrounding the card substrate 180*b* may be assembled to complete the memory card 100.

Figure 13:
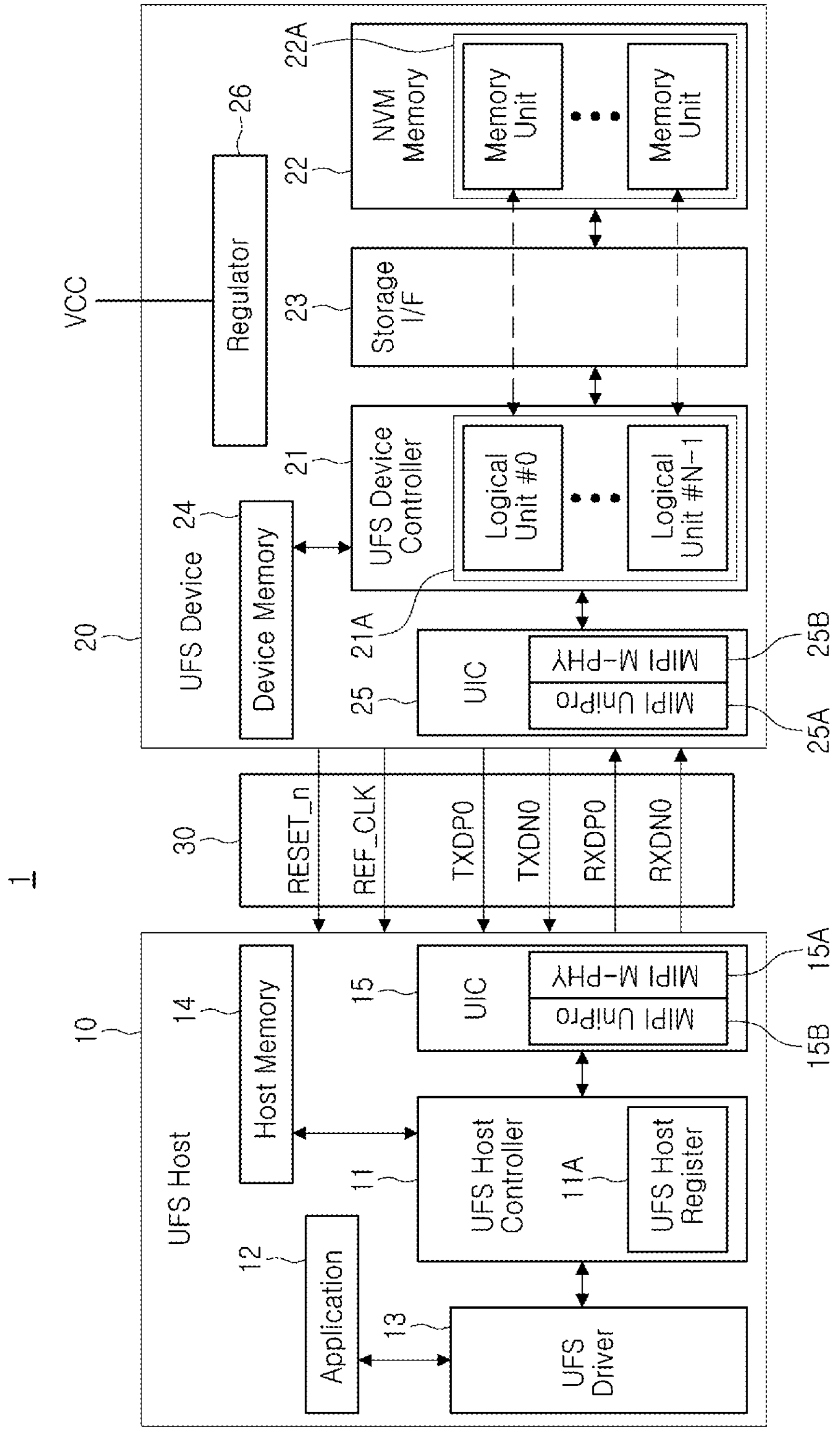
FIG. 13 is a view illustrating a system including a memory card according to an example embodiment.

FIG. 13 is a view illustrating a system including a memory card according to an example embodiment.

FIG. 13 is a view illustrating a UFS system 1 according to an example embodiment. The UFS system 1 may be a system conforming to a UFS standard announced by Joint Electron Device Engineering Council (JEDEC), and may include a UFS host 10, a UFS device 20, and a UFS interface 30.

Referring to FIG. 13, the UFS host 10 and the UFS device 20 may be connected to each other through the UFS interface 30. The UFS device 20 may correspond to the integrated circuit package 20 described with reference to FIGS. 4 to 5. The UFS device controller 21 and the nonvolatile memory 22 may correspond to the controller chip 230 and the memory chips 241 to 248 of FIG. 4.

The UFS host 10 may include a UFS host controller 11, an application 12, a UFS driver 13, a host memory 14, and a UFS interconnect (UIC) layer 15. The UFS device 20 may include a UFS device controller 21, a nonvolatile memory 22, a storage interface 23, a device memory 24, a UIC layer 25, and a regulator 26. The nonvolatile memory 22 may include a plurality of memory units 22A. Each of the memory units 22A may include a V-NAND flash memory having a two-dimensional (2D) structure or a three-dimensional (3D) structure, but may include another type of nonvolatile memory such as PRAM and/or RRAM. The UFS device controller 21 and the nonvolatile memory 22 may be connected to each other through the storage interface 23. The storage interface 22 may be configured to comply with a standard protocol such as Toggle or ONFI.

The application 12 may refer to a program required to communicate with the UFS device 20 to use functions of the UFS device 22. The application 12 may transmit input-output requests (IORs) to the UFS driver 13 for input/output (I/O) operations on the UFS device 20. The IORs may refer to a data read request, a data storage (or write) request, and/or a data erase (or discard) request, but example embodiments are limited thereto.

The UFS driver 13 may manage the UFS host controller 11 through a UFS-host controller interface (UFS-HCI). The UFS driver 2130 may convert the IOR, generated by the application 12, into a UFS command defined by the UFS standard and may transmit the UFS command to the UFS host controller 2110. A single IOR may be converted into a plurality of UFS commands. Although the UFS command may basically be defined by an SCSI standard, the UFS command may be a command dedicated to the UFS standard.

The UFS host controller 11 may transmit the UFS command, converted by the UFS driver 2130, to the UIC layer 25 of the UFS device 20 through the UIC layer 15 and the UFS interface 30. During the transmission of the UFS command, a UFS host register 11A of the UFS host controller 11 may serve as a command queue (CQ).

The UIC layer 15 on a side of the UFS host 10 may include a mobile industry processor interface (MIPI) M-PHY 15A and an MIPI UniPro 15B, and the UIC layer 25 on a side of the UFS device 20 may also include an MIPI M-PHY 25A and an MIPI UniPro 25B.

The UFS interface 30 may include a line configured to transmit a reference clock signal REF_CLK, a line configured to transmit a hardware reset signal RESET_n for the UFS device 20, a pair of lines configured to transmit a pair of differential input signals RXDP0 and RXDN0, and a pair of lines configured to transmit a pair of differential output signals TXDP0 and TXDN0.

A frequency of a reference clock signal REF_CLK provided from the UFS host 10 to the UFS device 20 may be one of 19.2 MHz, 26 MHz, 38.4 MHz, and 52 MHz, but example embodiments are not limited thereto. The UFS host 10 may change the frequency of the reference clock signal REF_CLK even during an operation, for example, even during data transmission and receiving operations between the UFS host 10 and the UFS device 20. The UFS device 20 may generate cock signals having various frequencies from the reference clock signal REF_CLK, provided from the UFS host 10, using a phase-locked loop (PLL), or the like. Also, the UFS host 10 may set a value of a data rate between the UFS host 10 and the UFS device 20 through a frequency value of the reference clock signal REF_CLK. For example, the value of the data rate may be determined depending on the frequency of the reference clock signal REF_CLK.

The UFS interface 30 may support a plurality of lanes, and each of the lines may be implemented as a pair of differential lines. For example, the UFS interface 30 may include at least one receive lane and at least one transmit lane. In FIG. 5, a pair of lines configured to transmit a pair of differential input signals RXDP0 and RXDN0 may constitute a receive lane, and a pair of lines configured to transmit a pair of differential output signals TXDP0 and TXDN0 may constitute a transmit lane. Although a single transmit lane and a single receive lane are illustrated in FIG. 5, the number of transmit lanes and the number of receive lanes may vary according to example embodiments.

The receive lane and the transmit lane may transmit data based on a serial communication scheme. Full-duplex communications between the UFS host 10 and the UFS device 20 may be enabled due to a structure in which the receive lane and the transmit lane are separated to each other. For example, the UFS device 20 may transmit data to the UFS host 10 through the transmit lane even while receiving data from the UFS host 10 through the receive lane. In addition, control data, for example, a command, from the UFS host 10 to the UFS device 20 and user data to be stored in or read from the nonvolatile memory 22 of the UFS device 20 by the UFS host 10 may be transmitted through the same lane. Accordingly, there may be no need to further provide an additional lane for data transmission, other than a pair of receive lanes and a pair of transmit lanes, between the UFS host 10 and the UFS device 20.

The UFS device controller 21 of the UFS device 20 may control all operations of the UFS device 20. The UFS device controller 21 may manage the nonvolatile memory 22 using a logical unit (LU) 22A, a logical data storage unit. The number of LUs 22A may be eight (8), but example embodiments are limited thereto. The UFS device controller 21 may include a flash translation layer (FTL) and may convert a logical data address (for example, a logical block address (LBA)) received from the UFS host 2100) into a physical data address (for example, a physical block address (PBA)) using address mapping information of the FTL. A logical block configured to store user data in the UFS system 1 may have a size in a predetermined range. For example, a minimum size of the logical block may be set to be 4 Kbytes.

When a command from the UFS host 10 is input to the UFS device 20 through the UIC layer 25, the UFS device controller 21 may perform an operation in response to the command and may transmit a completion response to the UFS host 10 when the operation is completed.

As an example, when the UFS host 10 intends to store user data in the UFS device 20, the UFS host 10 may transmit a data storage command to the UFS device 20. When a response indicating that the UFS host 10 is ready to receive user data (a "ready-to-transfer" response) is received from the UFS device 20, the UFS host 10 may transmit user data to the UFS device 20. The UFS device controller 21 may temporarily store the received user data in the device memory 24 and may store the temporarily stored user data in a selected location of the nonvolatile memory 2220 based on the address mapping information of the FTL.

As another example, when the UFS host 10 intends to read the user data stored in the UFS device 20, the UFS host 10 may transmit a data read command to the UFS device 20. The UFS device controller 21, which has received the command, may read the user data from the nonvolatile memory 22 based on the data read command and may temporarily store the read user data in the device memory 24. During the read operation, the UFS device controller 21 may detect and correct an error in the read user data using an ECC engine, not illustrated, embedded therein. For example, the ECC engine may generate parity bits for write data to be written to the nonvolatile memory 22, and the generated parity bits may be stored in the nonvolatile memory 22 along with the write data. When data is read from the nonvolatile memory 22, the ECC engine may correct an error in read data using the parity bits read from the nonvolatile memory 22 along with the read data and may output error-corrected read data.

In addition, the UFS device controller 21 may transmit user data, temporarily stored in the device memory 24, to the UFS host 10. In addition, the UFS device controller 21 may further include an advanced encryption standard (AES) engine, not illustrated. The AES engine may perform at least of an encryption operation and a decryption operation on data, input to the UFS device controller 21, using a symmetric-key algorithm.

The UFS host 10 may sequentially store commands to be transmitted to the UFS device 20, in the UFS host register 2111 which may serve as a common queue, and may sequentially transmit the commands to the UFS device 20. In this case, even while a previously transmitted command is still being processed by the UFS device 20, for example, even before receiving a notification that the previously transmitted command has been processed by the UFS device 20, the UFS host 10 may transmit a next command, which is on standby in the command queue, to the UFS device 20. Accordingly, the UFS device 20 may also receive a next command from the UFS host 10 while processing the previously transmitted command. A maximum number (or a queue depth) of commands which may be stored in the command queue may be, for example, 32. Also, the command queue may be implemented as a circular queue in which a start and an end of a command line stored in a queue are indicated by a head pointer and a tail pointer.

Each of the plurality of memory units 22A may include a memory cell array, not illustrated, and a control circuit, not illustrated, configured to control an operation of the memory cell array. The memory cell array may include a 2D memory cell array or a 3D memory cell array. The memory cell array may include a plurality of memory cells. Although each of the memory cells is a single-level cell (SLC) configured to store a single bit of information, each of the memory cells may be a cell configured to store two or more bits of information, such as a multi-level cell (MLC), a triple-level cell (TLC), and a quadruple-level cell (QLC). The 3D memory cell array may include a vertical NAND string in which at least one memory cell is vertically oriented to be disposed on another memory cell.

As a power supply voltage, VCC may be input to the UFS device 20. The voltage VCC may be a main power supply voltage for the UFS device 20, and may have a value ranging from 2.4 V to 3.6 V. The power supply voltages may be supplied through the regulator 2260 to respective components of the UFS device 20. For example, a voltage having a value ranging from 1.14 V to 1.26 V may be mainly supplied to the UFS device controller 21. A voltage having a value ranging from 1.7 V to 1.95 V may be mainly supplied to an input/output interface such as the MIPI M-PHY 251.

According to an example embodiment, the UFS host 10 may include an SD card standard socket corresponding to the SD bus protocol. In addition, the UFS device 20 may include an integrated circuit package. The UFS device 20 may be implemented as a memory card including a plurality of external contact terminals electrically connected to the UFS host 10 when the UFS device 20 is accommodated in the SD card standard socket. The integrated circuit package included in the memory card, for example, the UFS package, may include package terminals for transmitting and receiving signals to and from an external entity. The package terminals may be electrically connected to the plurality of external contact terminals in the memory card.

According to an example embodiment, even when the UFS host 10 includes an SD card standard socket, a memory card including a UFS package may be accommodated in the socket to transmit and receive signals based on the UFS host 10 and the UFS protocol. Accordingly, compatibility of the UFS package may be improved and utilization may be increased.

Figure 14:
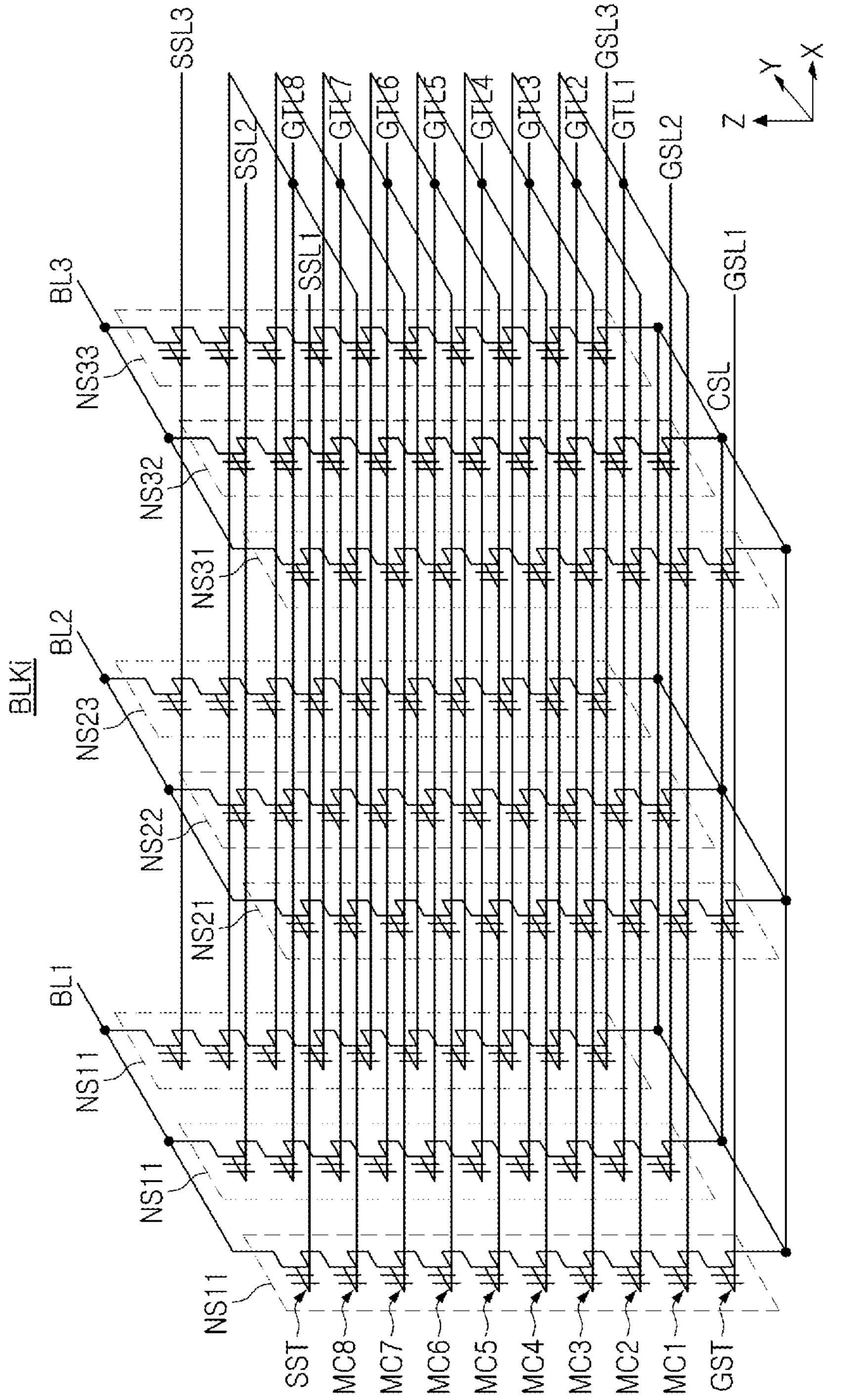
FIG. 14 is a perspective view illustrating a detailed configuration of a memory chip included in an integrated circuit package.

FIG. 14 is a view illustrating a structure of a memory cell array which may be applied an integrated circuit package.

FIG. 14 is a view illustrating a 3D V-NAND structure which may be applied to a UFS device according to an example embodiment. When a storage module of a UFS device is implemented as a 3D V-NAND type flash memory, each of a plurality of memory blocks constituting the storage module may be represented by an equivalent circuit as illustrated in FIG. 14.

A memory block BLKi illustrated in FIG. 14 represents a three-dimensional memory block formed on a substrate in a three-dimensional structure. For example, a plurality of memory NAND strings included in the memory block BLKi may be formed in a direction, perpendicular to the substrate.

Referring to FIG. 14, the memory block BLKi may include a plurality of NAND strings NS11 to NS33 connected between bitlines BL1, BL2 and BL3 and a common source line CSL. Each of the NAND strings NS11 to NS33 may include a string select transistor SST, a plurality of memory cells MC1 to MC8, and a ground select transistor GST. In FIG. 14, each of the NAND strings NS11 to NS33 is illustrated as including eight memory cells MC1 to MC8, but example embodiments are not limited thereto.

Each string select transistor SST may be connected to a corresponding string select line (one of SSL1, SSL2, and SSL3). The plurality of memory cells MC1 to MC8 may be connected to corresponding gate lines GTL1 to GTL8, respectively. The gate lines GTL1 to GTL8 may correspond to wordlines, and some of the gate lines GTL1 to GTL8 may correspond to dummy wordlines. The ground select transistor GST may be connected to a corresponding ground select line (one of GSL1, GSL2, and GSL3). The string select transistor SST may be connected to a corresponding bitline (one of BL1, BL2, and BL3), and the ground select transistor GST may be connected to a common source line CSL.

Wordlines (for example, WL1) having the same height may be commonly connected, and the ground select lines GSL1, GSL2, and GSL3 and the string select lines SSL1, SSL2, and SSL3 may be separated. In FIG. 8, the memory block BLKi is illustrated as being connected to eight gate lines GTL1 to GTL8 and three bitlines BL1, BL2, and BL3, but example embodiments are not limited thereto.

Figure 15:
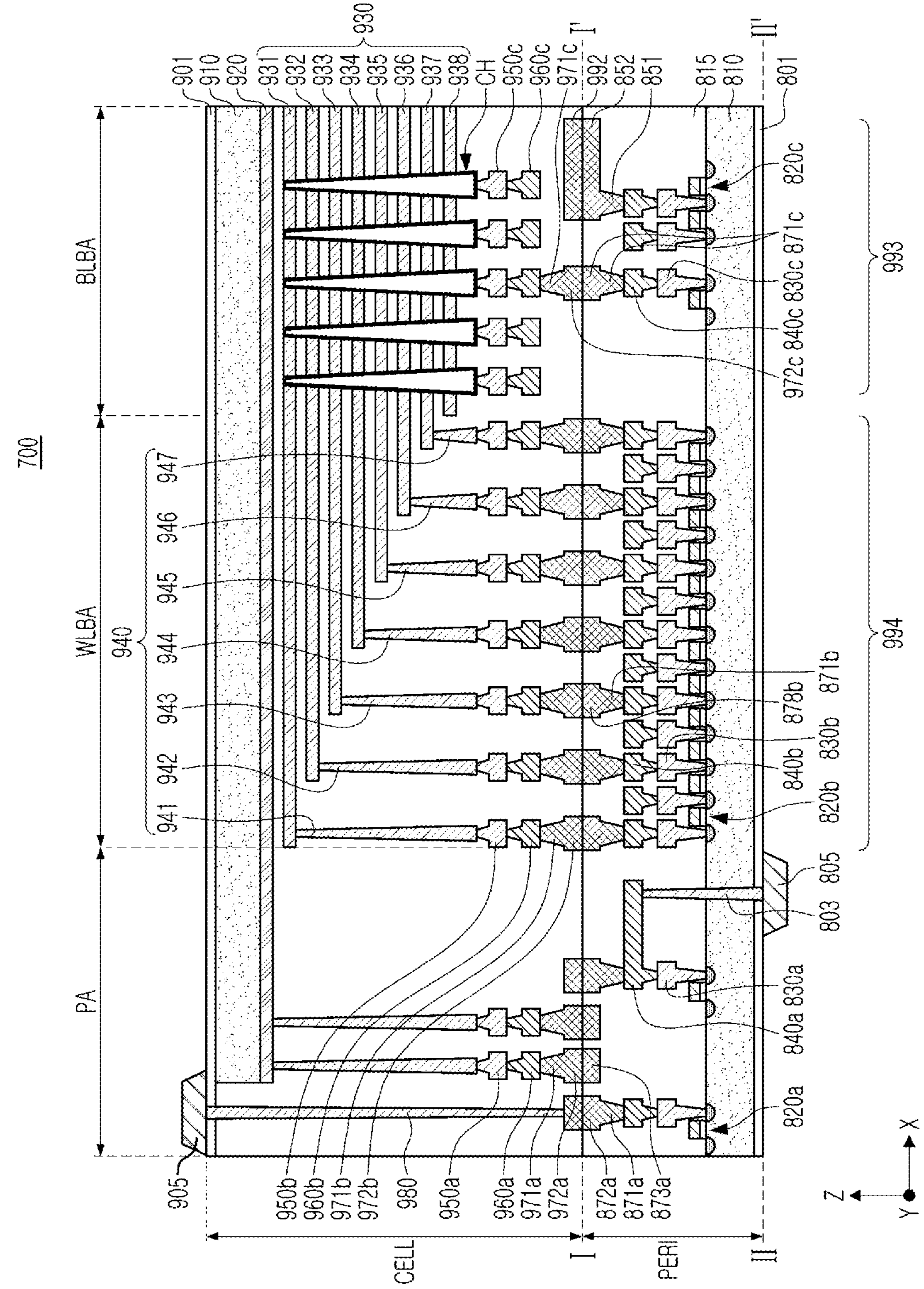
FIG. 15 is a view illustrating a memory cell array according to an example embodiment.

FIG. 15 is a perspective view illustrating a detailed configuration of a memory chip included in an integrated circuit package.

Referring to FIG. 15, a memory device 700 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then bonding the upper chip and the lower chip to each other. As an example, the bonding process may refer to a process of electrically connecting a bonding metal, formed on a lowermost metal layer of the upper chip, and a bonding metal, formed on an uppermost metal layer of the lower chip, to each other. For example, when the bonding metals include copper (Cu), the bonding process may be a Cu-to-Cu bonding process and the bonding metals may be formed of aluminum (Al) or tungsten (W).

Each of the peripheral circuit region PERI and the cell region CELL of the memory device 700 may include an external pad bonding area PA, a wordline bonding area WLBA, and a bitline bonding area BLBA. The peripheral circuit region PERI may include a first substrate 810, an interlayer insulating layer 815, a plurality of circuit devices 820*a*, 820*b*, and 820*c* formed on the first substrate 810, first metal layers 830*a*, 830*b*, and 830*c*, respectively connected to the a plurality of circuit devices 820*a*, 820*b*, and 820*c*, and second metal layers 840*a*, 840*b*, and 840*c* formed on the first metal layers 830*a*, 830*b*, and 830*c*. In an example embodiment, the first metal layers 830*a*, 830*b*, and 830*c* may be formed of tungsten having relatively high resistance, and the second metal layers 840*a*, 840*b*, and 840*c* may be formed of copper having relatively low resistance.

In the present specification, although only the first metal layers 830*a*, 830*b*, and 830*c* and the second metal layers 840*a*, 840*b*, and 840*c* are illustrated and described, example embodiments are not limited thereto, and one or more metal layers may be further formed on the second metal layers 840*a*, 840*b*, and 840*c*. At least a portion of the one or more metal layers formed on the second metal layers 840*a*, 840*b*, and 840*c* may be formed of aluminum, or the like, having resistance, lower than resistance of copper forming the second metal layers 840*a*, 840*b*, and 840*c*.

The interlayer insulating layer 815 may be disposed on the first substrate 810 to cover the plurality of circuit devices 820*a*, 820*b*, and 820*c*, the first metal layers 830*a*, 830*b*, and 830*c*, and the second metal layers 840*a*, 840*b*, and 840*c*. The interlayer insulating layer 815 may include an insulating material such as a silicon oxide, a silicon nitride, or the like.

Lower bonding metals 871*b* and 872*b* may be formed on the second metal layer 840*b* in the wordline bonding area WLBA. In the wordline bonding area WLBA, the lower bonding metals 871*b* and 872*b* in the peripheral circuit region PERI may be electrically bonded to upper bonding metals 971*b* and 972*b* of the cell region CELL. The lower bonding metals 871*b* and 872*b* and the upper bonding metals 971*b* and 972*b* may be formed of aluminum, copper, tungsten, or the like. The upper bonding metals 971*b* and 972*b* in the cell region CELL may be referred to as first metal pads, and the lower bonding metals 871*b* and 872*b* in the peripheral circuit region PERI may be referred to as second metal pads.

The cell region CELL may provide at least one memory block. The cell region CELL may include a second substrate 910 and a common source line 920. A plurality of wordlines 931 to 938 (for example, 930) may be stacked on the second substrate 910 in a direction (a Z-axis direction), perpendicular to an upper surface of the second substrate 910. At least one string select line and at least one ground select line may be arranged above and below the plurality of wordlines 930, respectively. The plurality of wordlines 930 may be disposed between the at least one string select line and the at least one ground select line.

In the bitline bonding area BLBA, a channel structure CH may extend in a direction (a Z-axis direction), perpendicular to the upper surface of the second substrate 910, to penetrate through the plurality of wordlines 930, the at least one string select line, and the at least one ground select line. The channel structure CH may include a data storage layer, a channel layer, a buried insulating layer, and the like, and the channel layer may be electrically connected to a first metal layer 950*c* and a second metal layer 960*c*. For example, the first metal layer 950*c* may be a bitline contact, and the second metal layer 960*c* may be a bitline. In an example embodiment, the bitline 960*c* may extend in a first direction (a Y-axis direction), parallel to an upper surface of the second substrate 910.

In the embodiment illustrated in FIG. 15, an area in which the channel structure CH, the bitline 960*c*, and the like, are disposed may be defined as the bitline bonding area BLBA. In the bitline bonding area BLBA, the bitline 960*c* may be electrically connected to the circuit devices 820*c* providing a page buffer 993 in the peripheral circuit region PERI. As an example, the bitline 960*c* may be connected to upper bonding metals 971*c* and 972*c* in the cell region CELL, and the upper bonding metals 971*c* and 972*c* may be connected to lower bonding metals 871*c* and 872*c* connected to the circuit devices 820*c* of the page buffer 993.

In the wordline bonding area WLBA, the wordlines 930 may extend in a second direction (an X-axis direction), parallel to the upper surface of the second substrate 910, and may be connected to a plurality of cell contact plugs 941 to 947 (for example, 940). The plurality of wordlines 930 and the plurality of cell contact plugs 940 may be connected to each other in pads provided by at least a portion of the plurality of wordlines 930 extending by different lengths in the second direction. A first metal layer 950*b* and a second metal layer 960*b* may be sequentially connected to an upper portion of the plurality of cell contact plugs 940 connected to the plurality of wordlines 930. The plurality of cell contact plugs 940 may be connected to the peripheral circuit region PERI through the upper bonding metals 971*b* and 972*b* of the cell region CELL and the lower bonding metals 871*b* and 872*b* of the peripheral circuit region PERI in the wordline bonding area WLBA.

The plurality of cell contact plugs 940 may be electrically connected to the circuit devices 920*b*, providing a row decoder 994, in the peripheral circuit region PERI. In an example embodiment, operating voltages of the circuit devices 820*b* providing the row decoder 994 may be different from operating voltages of the circuit devices 820*c* providing the page buffer 993. As an example, operating voltages of the circuit devices 820*c* providing the page buffer 993 may be higher than operating voltages of the circuit devices 820*b* providing the row decoder 994.

A common source line contact plug 980 may be disposed in the external pad bonding area PA. The common source line contact plug 980 may be formed of a conductive material such as a metal, a metal compound, polysilicon, or the like, and may be electrically connected to the common source line 920. A first metal layer 950*a* and a second metal layer 960*a* may be sequentially stacked on the common source line contact plug 980. As an example, an area in which the common source line contact plug 980, the first metal layer 950*a*, and the second metal layer 960*a* are disposed may be defined as the external pad bonding area PA.

Input/output pads 805 and 905 may be disposed in the external pad bonding area PA. Referring to FIG. 15, a lower insulating layer 801 may be formed below the first substrate 810 to cover a lower surface of the first substrate 810, and a first input/output pad 805 may be formed on the lower insulating layer 801. The first input/output pad 805 may be connected to at least one of the plurality of circuit devices 820*a*, 820*b*, and 820*c*, disposed in the peripheral circuit region PERI, through a first input/output contact plug 803, and may be separated from the first substrate 810 by the lower insulating layer 801. In addition, a side insulating layer may be disposed between the first input/output contact plug 803 and the first substrate 810 to electrically separate the first input/output contact plug 803 and the first substrate 810.

Referring to FIG. 15, an upper insulating layer 901 may be formed on the second substrate 910 to cover the upper surface of the second substrate 910, and a second input/output pad 905 may be disposed on the upper insulating layer 901. The second input/output pad 905 may be connected to at least one of the plurality of circuit devices 820*a*, 820*b*, and 820*c*, disposed in the peripheral circuit region PERI, through a second input/output contact plug 903.

According to embodiments, the second substrate 910 and the common source line 920 may not be disposed in an area in which the second input/output contact plug 903 is disposed. The second input/output pad 905 may not overlap the wordlines 930 in a third direction (a Z-axis direction). Referring to FIG. 15, the second input/output contact plug 903 may be separated from the second substrate 910 in a direction, parallel to the upper surface of the second substrate 910, and may penetrate through the interlayer insulating layer 815 of the cell region CELL to be connected to the second input/output pad 905.

According to example embodiments, the first input/output pad 805 and the second input/output pad 905 may be selectively formed. As an example, the memory device 800 may include only the first input/output pad 805 disposed on the first substrate 910 or the second input/output pad 905 disposed on the second substrate 910. Alternatively, the memory device 800 may include both the first input/output pad 805 and the second input/output pad 905.

A metal pattern of an uppermost metal layer may be present as a dummy pattern or the uppermost metal layer may be absent, in each of the external pad bonding area PA and the bitline bonding area BLBA, respectively included in the cell region CELL and the peripheral circuit region PERI.

In the external pad bonding area PA, the memory device 800 may include a lower metal pattern 873*a*, corresponding to an upper metal pattern 972*a* formed in an uppermost metal layer of the cell region CELL, and have the same cross-sectional shape as the upper metal pattern 972*a* of the cell region CELL in an uppermost metal layer of the peripheral circuit region PERI. In the peripheral circuit region PERI, the lower metal pattern 973 a formed in the uppermost metal layer of the peripheral circuit region PERI may not be connected to a contact. Similarly, in the external pad bonding area PA, an upper metal pattern 972 *a*, corresponding to the lower metal pattern 973*a* formed in an uppermost metal layer of the peripheral circuit region PERI, may have the same shape as a lower metal pattern 973*a* of the peripheral circuit region PERI and may be formed in an uppermost metal layer of the cell region CELL.

The lower bonding metals 871*b* and 872*b* may be formed on the second metal layer 840*b* in the wordline bonding area WLBA. In the wordline bonding area WLBA, the lower bonding metals 871*b* and 872*b* of the peripheral circuit region PERI may be electrically connected to the upper bonding metals 971*b* and 972*b* of the cell region CELL by a bonding method.

Further, in the bitline bonding area BLBA, an upper metal pattern 992, corresponding to a lower metal pattern 852 formed in the uppermost metal layer of the peripheral circuit region PERI, may have the same cross-sectional shape as the lower metal pattern 852 of the peripheral circuit region PERI and may be formed in an uppermost metal layer of the cell region CELL. A contact may not be formed on the upper metal pattern 992 formed in the uppermost metal layer of the cell region CELL.

In an example embodiment, to correspond to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

When a form factor of the integrated circuit package is limited to a predetermined standard, it may be difficult for the storage device to be compatible with various host devices and utilization of the storage device may be reduced. As described above, a memory card compliant with a first standard may accommodate an integrated circuit package compliant with a second standard to improve compatibility of the integrated circuit package with a host device and to increase utilization of the integrated circuit package.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A memory card comprising:

a case compliant with a first standard, corresponding to a first protocol;

a card substrate embedded in the case;

a plurality of external contact terminals corresponding to the first standard on an upper surface of the card substrate, the external contact terminals having at least a portion exposed outwardly of the case; and a multichip integrated circuit package attached to the upper surface of the card substrate, the multichip integrated circuit package including:

a package substrate including a first surface and a second surface opposite to the first surface, a plurality of stacked memory chips disposed on the first surface of the package substrate, a controller chip disposed on the first surface of the package substrate and configured to control the plurality of memory chips, and a plurality of package terminals corresponding to a second protocol, the plurality of package terminals being disposed on the second surface of the package substrate, wherein first external contact terminals among the plurality of external contact terminals are hard-wired to first package terminals among the plurality of package terminals to transmit and receive signals based on the second protocol.

2. The memory card as claimed in claim 1, further comprising:

package-side terminals on the upper surface of the card substrate; and interconnection patterns configured to electrically connect the first external contact terminals and the package-side terminals to each other on the upper surface of the card substrate, wherein the package-side terminals and the first package terminals are electrically connected to each other through wires.

3. The memory card as claimed in claim 2, wherein:

the multichip integrated circuit package has a first surface, on which the plurality of package terminals are exposed, and a second surface on an opposite side of the first surface, and the first surface of the multichip integrated circuit package contacts the upper surface of the card substrate, and the second surface of the multichip integrated circuit package is exposed on the upper surface of the card substrate.

4. The memory card as claimed in claim 1, wherein:

the memory card includes package-side terminals on the upper surface of the card substrate;

interconnection patterns configured to electrically connect the first external contact terminals and the package-side terminals to each other on the upper surface of the card substrate, and the package-side terminals and the first package terminals are soldered to each other to be electrically connected to each other.

5. The memory card as claimed in claim 4, wherein:

the multichip integrated circuit package includes a first surface on which the plurality of package terminals of the multichip integrated circuit package are exposed, the first surface of the multichip integrated circuit package opposing the upper surface of the card substrate, and the package-side terminals are disposed in same positions as the plurality of package terminals in a first direction, parallel to the upper surface of the card substrate, and in a second direction intersecting the first direction.

6. The memory card as claimed in claim 4, wherein upper surfaces of the interconnection patterns are insulated from the multichip integrated circuit package.

7. The memory card as claimed in claim 1, wherein:

the first standard is a standard of a secure digital (SD) card, the first protocol is an SD bus protocol, and the second protocol is a universal flash storage (UFS) protocol.

8. The memory card as claimed in claim 7, wherein:

the first external contact terminals correspond to a micro SD card standard, and among the plurality of external contact terminals, remaining terminals other than the first external contact terminals are insulated from the multichip integrated circuit package.

9. The memory card as claimed in claim 1, wherein the external contact terminals include:

first to eighth external contact terminals aligned in a first direction, parallel to the upper surface of the card substrate; and a ninth external contact terminal disposed in a direction opposite to the first direction with respect to the first external contact terminal, the ninth external contact terminal having a position that is different from positions of the first to eighth external contact terminals in a second direction parallel to the upper surface of the card substrate and perpendicular to the first direction.

10. The memory card as claimed in claim 9, wherein the first package terminals include:

power supply terminals;

a clock terminal;

differential signal input terminals;

differential signal output terminals; and a hardware reset signal terminal.

11. The memory card as claimed in claim 10, wherein:

the first and ninth external contact terminals are connected to the differential signal input terminals, the second external contact terminal is connected to the hardware reset signal terminal, the fourth and sixth external contact terminals are connected to the power supply terminals, the fifth external contact terminal is connected to the clock terminal, and the seventh and eighth external contact terminals are connected to the differential signal output terminals.

12. The memory card as claimed in claim 11, wherein the third external contact terminal is electrically insulated from the multichip integrated circuit package.

13. The memory card as claimed in claim 11, wherein the power supply terminals include:

a first power supply terminal connected to a main power supply of the multichip integrated circuit package; and a second power supply terminal connected to a ground of the multichip integrated circuit package.

14. The memory card as claimed in claim 1, further comprising:

a switch disposed in a first recess groove of the case to control a write function of the memory card, wherein the card substrate includes a rounded notch located at a corner portion of the card substrate adjacent to the first recess groove to reduce probability of collision between the card substrate and the switch.

* * * * *